INVENTOR:
JOHN MASSEY TRIHEY
By Silverman & Cass
ATTORNEYS

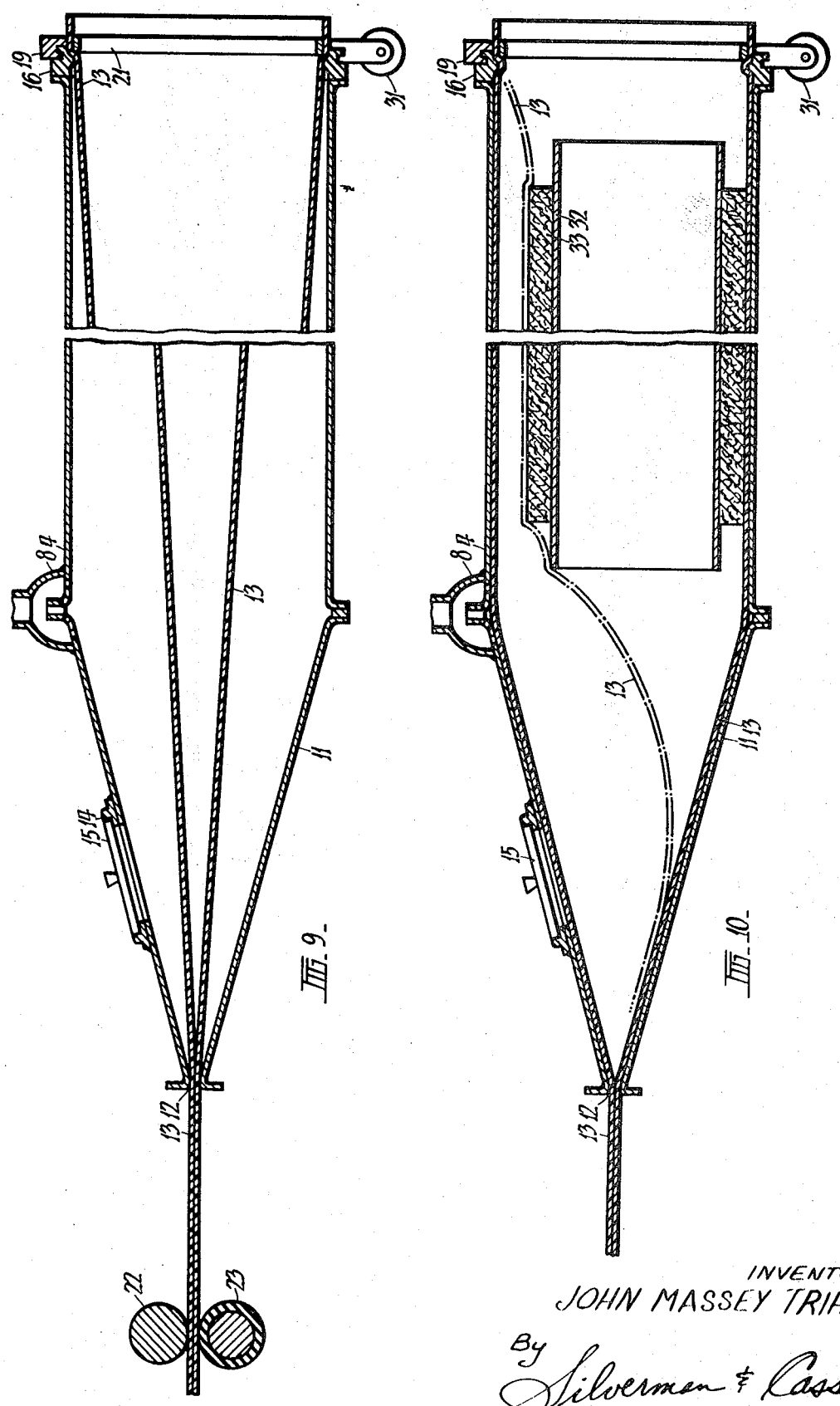

United States Patent Office 3,543,470
Patented Dec. 1, 1970

3,543,470
METHOD AND APPARATUS FOR WRAPPING ELONGATED ARTICLES
John Massey Trihey, Burwood, Victoria, Australia, assignor, by mesne assignments, to Johns-Manville Corporation, New York, N.Y., a corporation of New York
Filed Apr. 8, 1968, Ser. No. 719,530
Claims priority, application Australia, Apr. 10, 1967, 20,109/67
Int. Cl. B65b 1/16
U.S. Cl. 53—30       11 Claims

ABSTRACT OF THE DISCLOSURE

Elongated articles such as lengths of ducting are wrapped in tubing of expandible material such as polyethylene by expanding the tube within a vaccum chamber, inserting the article and then releasing the vacuum to allow the tube to relax onto the article.

CROSS REFERENCE TO RELATED APPLICATION

The invention was developed primarily for the purpose of lagging the flexible ducting described in my prior issued Patent No. 3,435,852. The ducting of this prior patent finds a major application in the field of heating and air-conditioning and in that application it is wrapped in an insulating layer of fibre glass and is then enclosed in a sheet of polyethylene.

BACKGROUND OF INVENTION

Field of invention

The invention is believed to be generally applicable in the field of wrapping elongated articles in tubes of expandible material. However, the particular field for which it was developed was for enclosing in polyethylene tubing of a lagged air-conditioning duct. It is nevertheless anticipated that there will be other applications for the invention.

Prior art

In the general field of lagging air-conditioning ducting the most common method is to apply the lagging in situ and to bind lagging into position by means, for example, of binding tape, staples or wire mesh. This method is generally laborious and is not suitable for the large volume production of factory lagged ducts such as can be made from the ducting of my aforesaid prior U.S. patent. In another known method the duct is first wrapped in a blanket of insulating material such as fibre glass and then wrapped in sheet plastic which is stapled or otherwise seamed. This method also is relatively laborious and costly. Furthermore there is the disadvantage, for some applications, that the sheath is not sealed.

SUMMARY

The basic object of the invention is to provide a method and apparatus whereby elongated articles and particularly lagged ducts may be neatly and easily sheathed in tubular expandible material such as tubular polyethylene.

According to this invention there is provided a method of wrapping elongated articles within a tube of expandible material which is characterized by the steps of inserting the tube into a chamber having a cross-sectional configuration to receive the article to be wrapped and a cross-sectional size greater than the tube, evacuating the space between the tube and the wall of the chamber to cause the tube to expand to a cross-sectional size greater than the article to be wrapped, inserting the article into the expanded tube and then releasing the vacuum to allow the expanded tube to relax and thereby encase the article.

The invention further provides apparatus for wrapping elongated articles within a tube of expandible material comprising a chamber having a cross-sectional configuration to receive the articles and a cross-sectional size greater than the tube, means to hold the tube open at one end and in sealed relation with the chamber and means to evacuate the space between the tube and the wall of the chamber.

In order that the invention will be better understood, it will now be more fully described with reference to apparatus which has been designed for applying a lagging of fibre glass and an outer sheathing of polyethylene tubing to an aluminum air-conditioning duct. This apparatus is more fully described with reference to the accompanying drawings.

BRIEF DESCRIPTION OF DRAWINGS

FIG. 9 is a fragmentary cross-sectional view of the chamber showing the tube in position.

FIG. 10 is a view similar to FIG. 9 showing the tube to be wrapped and showing, in full lines, the tube in its position after the chamber is evacuated and in dotted lines, in its position after the vacuum is released.

DESCRIPTION OF PREFERRED EMBODIMENT

Figure 1:
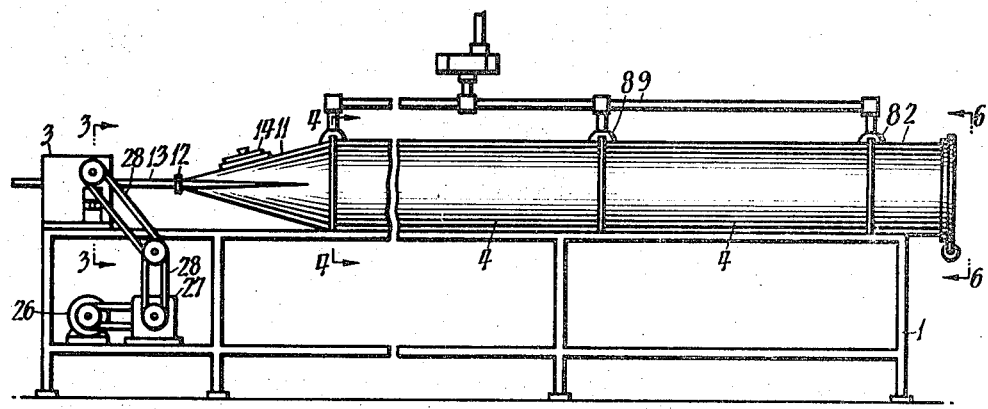
FIG. 1 is a side elevation showing the general arrangement of apparatus according to the invention.
Figure 2:
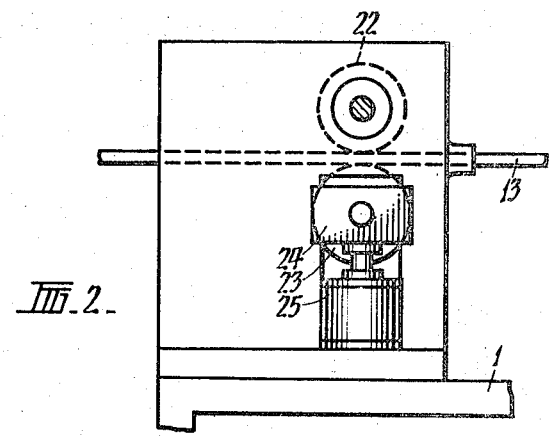
FIG. 2 is a side elevation, on the same scale of tube stretching means embodied in the apparatus.
Figure 3:
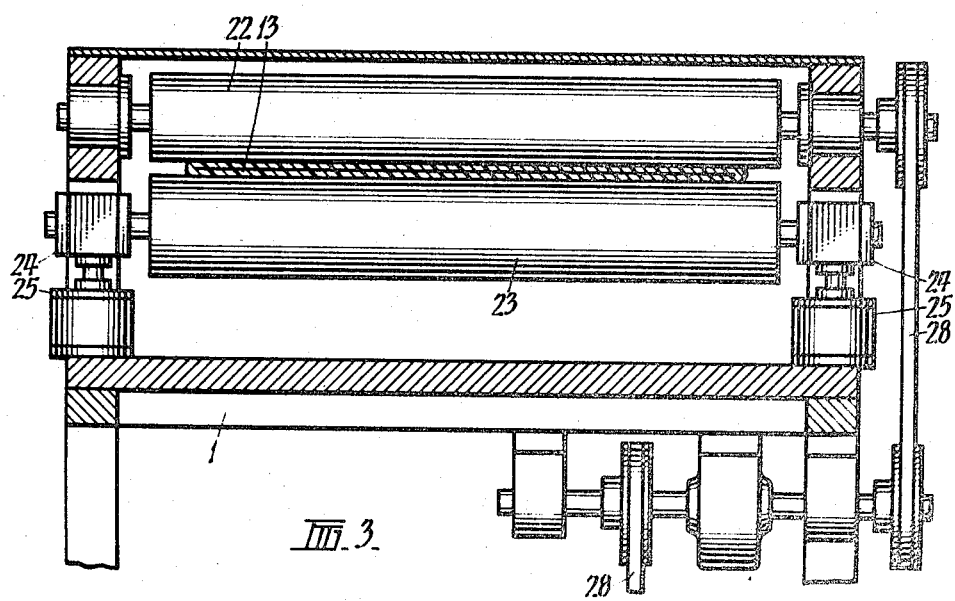
FIG. 3 is a cross-sectional view, on an enlarged scale on the line 3—3 in FIG. 1.
Figure 4:
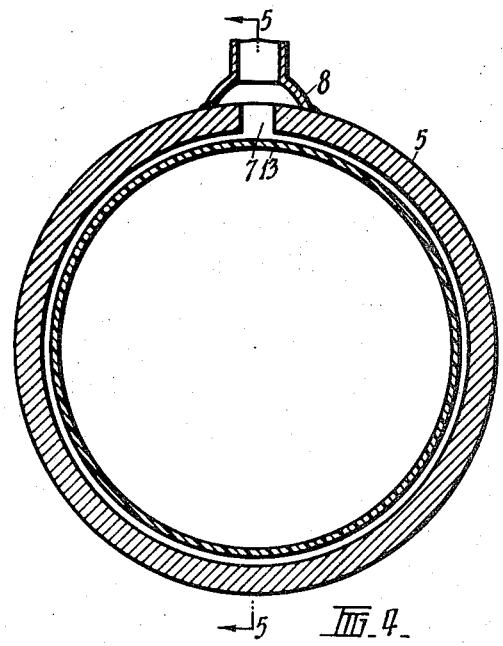
FIG. 4 is a cross-sectional view on the same scale as FIG. 3, on the line 4—4 in FIG. 1, with tubing in position in the chamber.
Figure 5:
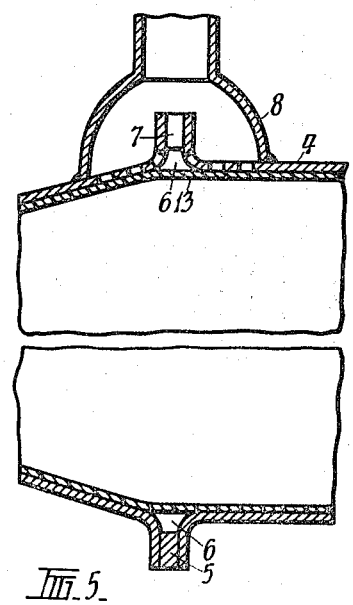
FIG. 5 is a cross-sectional view on the line 5—5 in FIG. 4.
Figure 6:
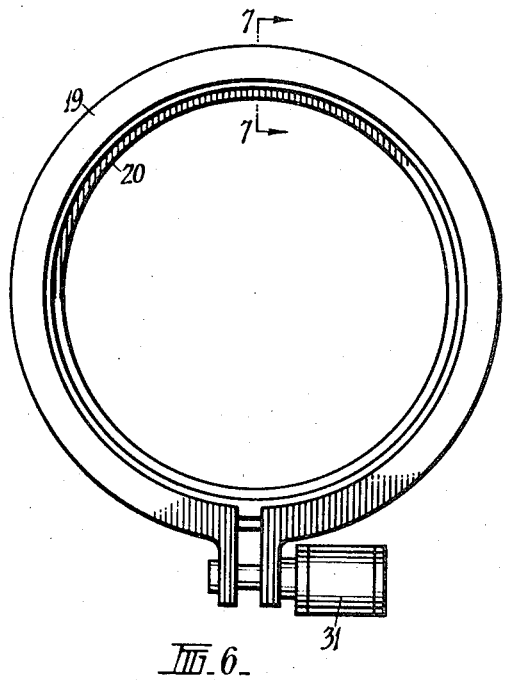
FIG. 6 is a cross-sectional view, on the same scale as FIG. 4, on the line 6—6 in FIG. 1 but with no tubing in position.
Figure 7:
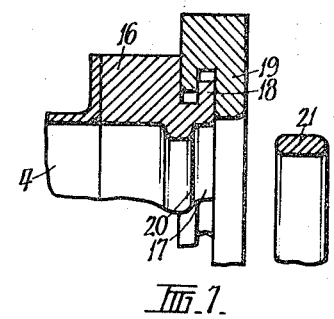
FIG. 7 is a cross-sectional view on a larger scale on the line 7—7 in FIG. 6.

The apparatus shown in the drawings comprises essentially a base frame 1 upon which is mounted a long cylindrical chamber 2, and at one end of a stretching mechanism 3. The chamber is made up of a number of flanged sections 4, assembled together with adjacent flanges spaced from one another by a spacing ring 5 to provide angular space 6 at the junction of each of the flanged sections. The spacing ring 5 is provided with gap 7 which communicates with a connecting piece which in turn is connected to a vacuum line 9. This in turn leads to a vacuum source, such as a pump (not shown). The end of the cylinder close to the feeding means is terminated in a flat nozzle-like element 11, the nozzle 12 of which is of just sufficient width and thickness to permit a flat polyethylene tube 13 to pass through the nozzle in the chamber. This nozzle section is also provided with an access and inspection opening 14 which is covered by clear plastic cover 15.

The opposite end of the chamber is terminated in a terminal ring 16 having an annular socket 17 and a lipped flange 18 which accommodates a split locking ring 19. The socket 17 serves to receive a retaining ring which in conjunction with the locking ring 19 serves to lock the polyethylene tube in position as will be more fully described hereinafter.

The stretching mechanism comprises a pair of nip rollers, the upper of which, 22, is a plain driven steel roller and the lower of which, 23, is a rubber-covered free roller which is rotatable in bearings 24 which are capable of being moved towards or away from the roller 22 by means of air-cylinder mechanisms 25. The drive to the rollers 22 is from the motor 26 via gearbox and clutch 27, and belts 28. The drive is in the direction opposite to the direction of forward feeding of the tube so that it serves to pull the tube backwards. The clutch is set to slip at a predetermined load so that a set tension is applied to the tube by the rollers.

Figure 8:
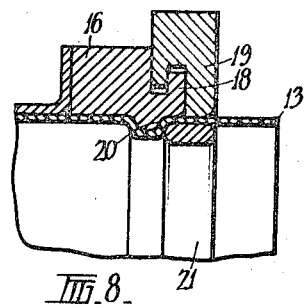
FIG. 8 is a view similar to FIG. 7 but with the tube and the locking ring in position.

In use of the apparatus for the lagging of an aluminum duct, the rollers 22, 23 are moved apart by the air cylinders 25 and the polyethylene tubing is pulling through the nozzle 12 and the cylinder to its far end. The retaining ring 21 is then inserted into its open end. The ring is then positioned against a shoulder 20 of the socket 17 and the nip rollers are operated to pull the tube back and thereby locate the retaining ring within the socket. When the tube is thus in position the split locking ring 19 is tightened by operation of the air cylinder 31 to lock it in position and thereby clamp the tube 13 between it and the retaining ring 21 (see FIG. 8). Vacuum is then applied to the cylinder. This causes the space between the polyethylene tube and the walls of the chamber to be evacuated and this in turn causes the tube to expand to the diameter of the cylinder as shown in FIG. 10 (full lines).

The duct 32 to be lagged is first wrapped with a wrapping of fibre-glass insulation 33 which is held temporarily in position by any suitable means such as a rubber band. The wrapped duct is then fed into the cylinder within the expanded polyethylene tube and after the duct and the wrapping are in position, the nip rollers are operated to again pull back the tube thereby stretching it in the longitudinal direction. This longitudinal stretching has been found to reduce or eliminate wrinkling of the finished product. The vacuum is simultaneously released allowing the tube to shrink back onto the lagged duct, as shown by the dotted lines in FIG. 10. The locking ring is released and the retaining ring is removed. The cylinders 25 are then operated to move the rollers 22 and 23 apart thereby releasing the tube and the enclosed duct is withdrawn from the cylinder at the same time pulling more polyethylene tube into the cylinder ready for the next operation.

The construction above described has the advantage that it provides a simple and effective means for achieving an otherwise difficult result. It has however, the further advantage that because the polyethylene tube is expanded under vacuum the tube is automatically tested for leaks since the process of the invention would not function satisfactorily on a tube which was torn or which had some other imperfection which would allow air to pass through the tube.

Whilst there has been described a method and apparatus for the lagging of a cylindrical air-conditioning duct, it will be understood that ducts of other shape such as square ducts may also be lagged by the same method. It will also be appreciated that the process of the invention is applicable to operations other than the lagging of ducts and these other applications and modifications are to be understood as coming within the spirit and scope of the invention defined by the appended claims.

The claims defining the invention are as follows:

1. A method of wrapping elongated articles within a tube of expandable material which is characterized by the steps of inserting the tube into a chamber having a cross-sectional configuration to receive the article to be wrapped and a cross-sectional size greater than the tube, retaining the tube at one end of the chamber in open and sealing relationship with the chamber, gripping the tube at the other end of the chamber to maintain the tube at said other end in closed configuration, evacuating the space between the tube and the wall of the chamber to cause the tube to expand to a cross-sectional size greater than the article to be wrapped, inserting the article into the expanded tube and then releasing the vacuum to allow the expanded tube to relax and thereby encase the article, releasing the tube from the chamber and removing the encased article from the chamber while simultaneously pulling more expandable material longitudinally through the chamber.

2. The method as claimed in claim 1, and further characterised by the step of longitudinally stretching the tube.

3. Apparatus for wrapping elongated articles within a tube of expandable material comprising a chamber having a cross-sectional configuration to receive the articles and a cross-sectional size greater than the tube, means to hold the tube open at one end and in sealed relation with the chamber, said means comprising a retaining ring adapted to be inserted into the end of the tube end to seat in a socket in one end of the chamber, means to evacuate the space between the tube and the wall of the chamber, and expandable material supply means at the end of said chamber for controlling movement of the material longitudinally through said chamber.

4. Apparatus as claimed in claim 3 and further comprising means to stretch the tube longitudinally.

5. Apparatus as claimed in claim 4 wherein the stretching means comprises a pair of nip rollers which may be operated selectively to grip the tube and stretch it or to release the tube and allow it to be pulled through the nip.

6. Apparatus as claimed in claim 3 and further comprising a locking ring adapted to clamp the tube against the retaining ring.

7. Apparatus as claimed in claim 3 wherein the chamber is provided at the end opposite the said one end with a slot through which the tube may be fed to the chamber in the flattened condition, said slot being of approximately the same width and thickness as the flattened tube.

8. Apparatus for wrapping elongated articles within a tube of expandible material comprising a chamber of cross-sectional configuration to receive the articles and a cross-sectional size greater than the tube, a socket at one end of the chamber and retaining ring adapted to be inserted into the tube and to seat in the socket to hold the tube open and in sealing relationship with the chamber and stretching means located at the other end of the chamber adapted to grip the tube and to stretch it whilst it is held by the said retaining ring.

9. Apparatus as claimed in claim 8 wherein the stretching means comprises a pair of nip rollers which may be operated selectively to grip the tube and stretch it or to release the tube and allow it to be pulled through the nip.

10. Apparatus as claimed in claim 8, and further comprising a locking ring adapted to clamp the tube against the retaining ring.

11. Apparatus as claimed in claim 8 wherein the chamber is provided at the end opposite the said one end with a slot through which the tube may be fed to the chamber in the flattened condition, said slot being of approximately the same width and thickness as the flattened tube.

References Cited

UNITED STATES PATENTS

| | | | |
|---|---|---|---|
| 2,570,259 | 10/1951 | McKinley | 156—143 |
| 2,331,762 | 10/1943 | Brown | 53—30 |
| 2,976,661 | 3/1961 | Bagnelle | 53—184 X |

THERON E. CONDON, Primary Examiner

E. F. DESMOND, Assistant Examiner

U.S. Cl. X.R.

53—184